Aug. 23, 1932.  H. MEYERINK  1,873,657
SCALE BALANCE CORRECTOR
Filed May 22, 1931
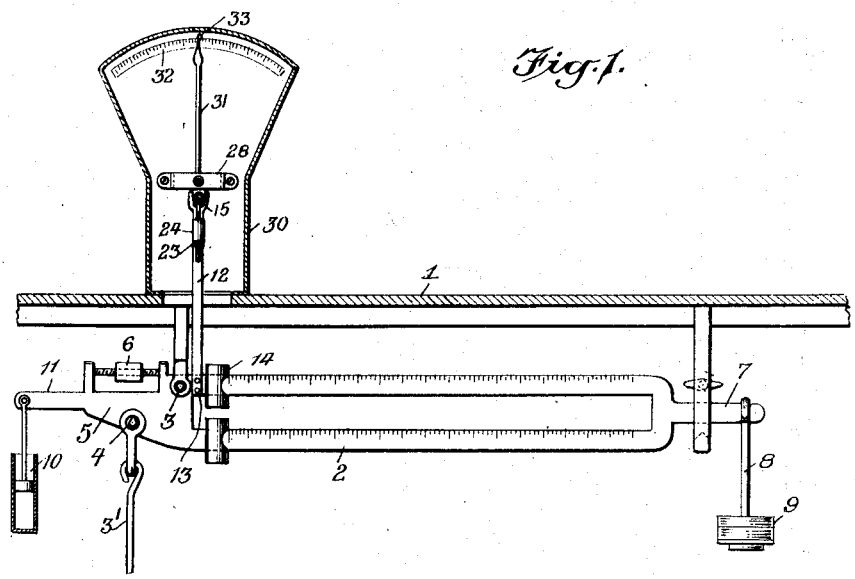
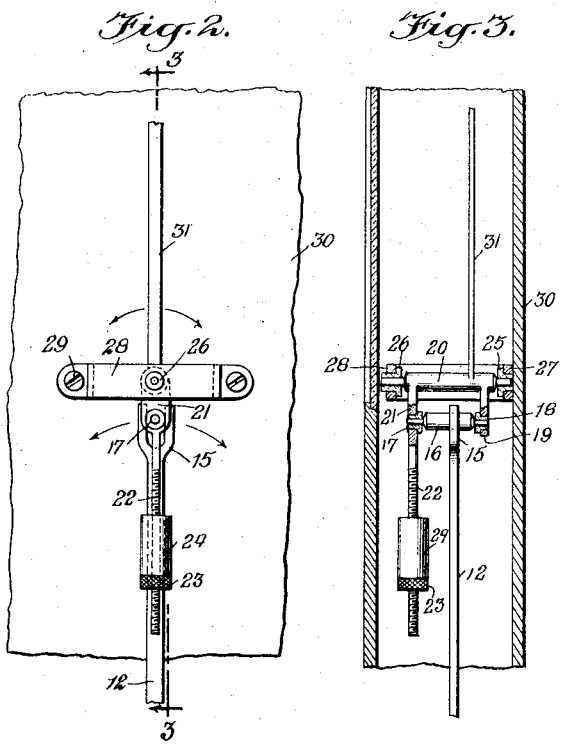
WITNESSES
INVENTOR
Henry Meyerink
BY
ATTORNEYS Patented Aug. 23, 1932

1,873,657

UNITED STATES PATENT OFFICE

HENRY MEYERINK, OF CLYMER, NEW YORK

SCALE BALANCE CORRECTOR

Application filed May 22, 1931. Serial No. 539,353.

This invention relates to scales and an improved corrector, the object being to provide a construction wherein an accurate balance may be secured.

Another object of the invention is to provide on a scale using a pivotally mounted balance means which is actuated by the balance for indicating when the balance is not exactly in balance.

A further object, more specifically, is to provide in a scale, a pointer and associated means for showing when the scale is exactly balanced or indicating when the scale is not in proper working order and also indicating when a weight thereon has been properly balanced with the weights on the scale beam.

In the accompanying drawing—

Figure 1 is a vertical sectional view through part of a scale showing an embodiment of the invention applied to the scale.

Figure 2 is an enlarged fragmentary side view of the working mechanism of the corrector shown in Figure 1.

Figure 3 is a sectional view through Figure 2 approximately on line 3—3, certain parts being broken away for better illustrating the construction.

Referring to the accompanying drawing by numerals, 1 indicates the top bar or frame of a scale, and 2 the usual scale beam. The scale beam 2 is pivotally supported at 3 and has the platform or weight to be weighed positioned to pull upon the rod 3' connected at 4 to the rear section 5 of the beam. All these parts are old and well known and form no part of the present invention except in combination. It will also be noted that a balance nut 6 is provided which is also old and well known. The beam 2 is provided with the usual extension 7 carrying the member 8 which supports the usual weights 9. The dashpot structure 10 is connected to the rear extension 11 so as to dampen but not prevent the up and down movement of the beam 2. Sometimes it is difficult to know whether the beam 2 is perfectly level and whether it is in exact balance, so as to know whether the scales are in proper condition for weighing correctly. A rod or actuating arm 12 is riveted or otherwise rigidly secured to the beam 2 at 13 which is only a short distance in front of the pivotal point 3. By positioning the arm 12 at this point, it is out of the way of the slide weight 14 and also is given quite an appreciable rocking or swinging movement as the beam 2 functions.

The upper end of the arm 12 is bifurcated or formed with a fork 15 which straddles the shaft 16 pivotally mounted in suitable agate or other suitable bearings 17 and 18. Bearing 18 is carried by the arm 19 rigidly secured to or formed integral with the rock shaft 20. Bearing 17 is mounted in the weight arm 21 which is threaded at 22 for receiving the nut 23. A weight 24 is slidably mounted on arm 21 and is held in the desired vertical position by nut 23. By rotating nut 23, the weight is raised or lowered according to the direction of rotation. As shown in Figure 3, arm 21 is integral with the rock shaft 20 though it could be independent and rigidly secured thereto. Rock shaft 20 is provided with journal pins mounted in journal members 25 and 26, said journal members being of agate or some other suitable material. Bearing member 25 is mounted on a bar 27 while bearing member 26 is mounted in a bracket 28. Bracket 28 is a substantially U-shaped structure and is held in place by screws 29, which screws also preferably extending through bar 27 for holding the same to the casing 30.

An indicating pointer 31 is preferably integral with the rock shaft 20 and extends upwardly an appreciable distance so that the upper end may move over the scale 32. The center of the scale is indicated by the zero mark 33 and when the end of the pointer 31 is opposite this zero mark, the beam 2 is horizontal, thus indicating a perfect balance. When adjusting the scales to secure a perfect balance without any weight thereon, the traveling nut 6 is adjusted until a substantially accurate balance is secured. If the pointer 31 is slightly off the zero mark 33, nut 23 is adjusted to raise or lower the weight 24 and this movement will give the final adjustment desired, namely, the counterbalancing effect to bring the scale beam 2 into the correct position and also the pointer 31 to the correct position for indicating perfect balance. Having set the scale in this manner, any desired weight according to the size of the scale may be weighed accurately. For instance if one pound is to be weighed and the scale 2 seemingly balances to one pound, the indicator 31 will indicate whether it is slightly more or slightly less. If desired, the graduations 32 could be marked off in ounces or fractions of an ounce, or may be marked off in even spaces for indicating the proportion that the article is over or under the desired weight.

The balance corrector set forth is very desirable for medicines and certain other articles which are to be used accurately. However, the device may be readily used on large scales without departing from the spirit of the inventon, as it continually indicates whether the object is over or under the weight desired, and also permits a very delicate adjustment to make the scales absolutely correct before an article is weighed.

I claim:

1. A balance corrector for scales comprising an actuating arm having a forked end, a rock shaft, a pointer extending from said rock shaft, a second arm extending from said rock shaft, a shaft carried by said second arm and positioned to be engaged by said forked end so that when the actuating arm is moved, said pointer will be swung in proportion to the movement of said rock shaft.

2. A balance corrector for scales having pivotally mounted beams comprising an actuating arm adapted to be rigidly secured at one end to a scale beam, a rock shaft arranged adjacent the upper end of said actuating arm, a pointer extending from said rock shaft, a scale over which said pointer is adapted to move and means for connecting the upper end of said actuating arm with said rock shaft so that as said upper end moves back and forth, it will rock said rock shaft.

3. In a balance corrector for scales, an actuating arm adapted to swing about a fixed point, a pointer, means providing an articulated connection between the pointer and the actuating arm, means for pivotally mounting the pointer whereby when the actuating arm is swung, the pointer will be correspondingly swung, and an adjustable weight depending from said means.

4. In a balanced corrector for scales, a pointer, a rock shaft carrying said pointer, a depending arm carried by said rock shaft, a weight slidably mounted on said arm, said arm being in the same vertical plane as said pointer, an actuating arm and an articulated connection between the actuating arm and the rock shaft, said connection transmitting power from the actuating arm to the shaft for rocking the same when the actuating arm has been moved.

5. In a balanced corrector for scales, a rock shaft, a pointer extending therefrom, a weight carrying arm extending from said rock shaft in the opposite direction to the pointer but in the same plane, an adjustable weight arranged on said arm, a second arm extending from said rock shaft, a shaft extending from said second arm to the first mentioned arm and carried by said arms, and an actuating arm having a forked end, said forked end straddling said shaft, whereby when the actuating arm is swung back and forth it will rock said rock shaft and correspondingly move said pointer.

HENRY MEYERINK.